US007885480B2

(12) United States Patent
Bryll et al.

(10) Patent No.: US 7,885,480 B2
(45) Date of Patent: Feb. 8, 2011

(54) CORRELATION PEAK FINDING METHOD FOR IMAGE CORRELATION DISPLACEMENT SENSING (75) Inventors: Robert Kamil Bryll, Bothell, WA (US); Benjamin Keith Jones, Seattle, WA (US); Karl Gustav Masreliez, Banyuls-sur-mer (FR)

(73) Assignee: Mitutoyo Corporation, Kawasaki-shi (JP)

( * ) Notice: Subject to any disclaimer, the term of this patent is extended or adjusted under 35 U.S.C. 154(b) by 1078 days.

(21) Appl. No.: 11/591,179

(22) Filed: Oct. 31, 2006

(65) Prior Publication Data

US 2008/0101722 A1 May 1, 2008

(51) Int. Cl.
G06K 9/64 (2006.01)

(52) U.S. Cl. .................. 382/278; 382/141; 382/148; 382/151; 382/294

(58) Field of Classification Search .............. 382/141, 382/148, 151, 278, 294
See application file for complete search history.

(56) References Cited

U.S. PATENT DOCUMENTS

| 4,805,123 | A | * | 2/1989 | Specht et al. ............... 382/144 |
| 5,359,513 | A | * | 10/1994 | Kano et al. ............... 382/128 |
| 5,485,224 | A | * | 1/1996 | Burns et al. ............... 348/699 |
| 5,495,535 | A | * | 2/1996 | Smilansky et al. .......... 382/145 |
| 6,016,116 | A | * | 1/2000 | Henderson et al. ............ 342/64 |
| 6,100,925 | A |   | 8/2000 | Rosser |
| 6,307,959 | B1 | * | 10/2001 | Mandelbaum et al. ...... 382/154 |
| 6,483,538 | B2 | * | 11/2002 | Hu ............................. 348/180 |
| 6,873,422 | B2 |   | 3/2005 | Nahum |

(Continued)

FOREIGN PATENT DOCUMENTS

WO  94/01830 A1  1/1994

(Continued)

OTHER PUBLICATIONS

Boltryk, P.J., et al., "Surface Fitting for Improving the Resolution of Peak Estimation on a Sparsely Sampled Two-Dimensional Surface With High Levels of Variance, for an Acoustic Velocity Log," Measurement Science and Technology 15(3):581-591, Feb. 2004.

(Continued)

Primary Examiner—Samir A Ahmed
Assistant Examiner—Jayesh Patel
(74) Attorney, Agent, or Firm—Christensen O'Connor Johnson Kindness PLLC (57) ABSTRACT A correlation function peak finding method for an image correlation displacement sensing system is provided. The method may include capturing a reference image and a displaced image, and searching for an initial peak correlation function value point (CFVP) with pixel-level resolution based on correlating the reference image and displaced images at a plurality of offset positions. Then a complete set of CFVPs may be determined at each offset position in an analysis region surrounding the initial peak CFVP. Then a preliminary correlation function peak location is estimated with sub-pixel resolution, based on CFVPs included in the analysis region. Finally, curve-fitting operations are performed to estimate a final correlation function peak location with sub-pixel accuracy, wherein the curve-fitting operations apply a windowing function and/or a set of weighting factors that is/are located with sub-pixel resolution based on the preliminary sub-pixel correlation function peak location.

11 Claims, 4 Drawing Sheets

U.S. PATENT DOCUMENTS

| | | | |
|---|---|---|---|
| 6,937,349 B2 | 8/2005 | Jones | |
| 6,990,254 B2 * | 1/2006 | Nahum | 382/278 |
| 6,996,291 B2 | 2/2006 | Nahum | |
| 7,065,258 B2 | 6/2006 | Nahum | |
| 7,085,431 B2 * | 8/2006 | Jones et al. | 382/278 |
| 2001/0033702 A1 * | 10/2001 | Kawabata | 382/294 |
| 2006/0045314 A1 * | 3/2006 | Gao et al. | 382/106 |

FOREIGN PATENT DOCUMENTS

| | | |
|---|---|---|
| WO | 97/00494 A1 | 1/1997 |

OTHER PUBLICATIONS

Papadimitriou, D.V., and T.J. Dennis, "A Stereo Disparity Algorithm for 3D Model Construction," Proceedings of Fifth International Conference on Image Processing and Its Applications, Conference Publication No. 410, Edinburgh, Jul. 4-6, 1995, pp. 178-182.

Stewart, C.V., "Robust Parameter Estimation in Computer Vision," SIAM [Society for Industrial and Applied Mathematics] Review 41(3):513-537, Sep. 1999.

* cited by examiner

CORRELATION PEAK FINDING METHOD FOR IMAGE CORRELATION DISPLACEMENT SENSING

FIELD OF THE INVENTION

This invention is directed to determining object displacements using image correlation.

BACKGROUND OF THE INVENTION

Various known devices use images acquired by a sensor array, and correlation between images acquired by the sensor array, to determine deformations and/or displacements of an object. For example, one class of such devices is described in U.S. Pat. No. 6,873,422 (the '422 patent), U.S. Pat. No. 6,990,254 (the '254 patent), U.S. Pat. No. 6,996,291 (the '291 patent), and U.S. Pat. No. 7,065,258 (the '258) patent, all to Nahum, each of which is hereby incorporated by reference in its entirety. In general, in such devices, prior to displacing or deforming the object, a first or reference image arising from the object is captured and stored. Then, after displacing or deforming the object, a second or subsequent image arising from the object is captured and stored. The first and second images are then quantitatively compared, e.g. by correlation operations, on a pixel-by-pixel basis. In general, a plurality of respective comparisons are performed with the first and second images offset, or spatially translated, relative to each other by different respective amounts (e.g. by varying the offset in one pixel increments between the various comparisons). Then the resulting quantitative comparison, such as a correlation function value, is plotted against its corresponding offset amount, or spatial translation position, to determine a correlation function value point. The offsets having the strongest correlations between the second and first images will generate a peak or a trough (depending on how the pixel-by-pixel comparison is performed) in the plot of correlation function value points. The offset amount corresponding to the peak or trough represents the amount of displacement or deformation between the first and second images.

Various methods are known for estimating the peak or trough in a plot of correlation function value points with sub-pixel resolution. One of the more accurate methods is disclosed in the '422 patent, which describes how a sub-pixel error that is spatially periodic at the pixel pitch of the sensor array may arise in the correlation peak location estimates provided by various methods that use curve fitting. The '422 teaches various methods for reducing such errors when estimating a correlation peak location. However, some level of periodic sub-pixel error may remain after the methods of the '422 are applied. U.S. Pat. No. 7,085,431 to Jones (the '431 patent), which is hereby incorporated herein by reference in its entirety, teaches a method wherein the previously indicated periodic sub-pixel errors, and other errors, are characterized and compensated. However, there are calibration costs and signal processing complexity associated with the methods of the '431 patent.

The present invention is directed to a correlation peak finding method for image correlation displacement sensing that provides reduced spatially periodic sub-pixel errors while overcoming the foregoing and other disadvantages.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Certain systematic periodic sub-pixel errors arise when estimating the best correlation location or offset between a reference image and displaced images. The systematic sub-pixel error arises because of the discrete sampling procedure that is inherent in the limited resolution of the reference image and displaced correlation images, and the limited resolution of the steps between the offset positions used when calculating correlation function value points (CFVPs) in typical image correlation techniques, and the like. These inaccuracies may be exacerbated when relatively few CFVPs are used when estimating the correlation function peak location.

A correlation function peak finding method for use in an image correlation displacement sensing system is provided. The method reduces the types of systematic sub-pixel errors outlined above. In accordance with one aspect of the invention, a windowing function and/or weighting factors are applied prior to, or as part of, fitting a correlation function curve to a number of CFVPs. The windowing function and/or weighting factors are determined with reference to the location of a preliminary estimate of the correlation function peak location, wherein the preliminary estimate of the correlation function peak location is made with sub-pixel resolution.

In accordance with another aspect of the invention, the preliminary estimate of the correlation function peak location that is made with sub-pixel resolution may be based on a relatively small number of CFVPs, e.g. four CFVPs.

In accordance with another aspect of the invention, the correlation function curve may be fit to a relatively small number of CFVPs, e.g. less than 25 CFVPs for a two-dimension correlation function curve, or as few as nine CFVPs for a two-dimension correlation function curve in various embodiments.

In accordance with another aspect of the invention, the windowing function and/or weighting factors are chosen to significantly attenuate the influence on the curve-fitting operations of the CFVPs near the periphery of an analysis region that is generally used for the curve-fitting operations associated with each of a number of displacement measurements. In various embodiments, the weighting factors may correspond to a conical windowing function, a Gaussian windowing function, or a sigmoid windowing function, or the like. In one embodiment where the analysis region has a size M=N=5, the weighting factors may be determined based on a conical windowing function corresponding to a weighting value of 1.0 at a location $(x_p, y_p)$ that corresponds to the location of the preliminary estimate of the correlation function peak location that is made with sub-pixel resolution, and a weighting value of zero at a radius of M/2 offset increments, or more, from the location $(x_p, y_p)$. In one embodiment, the windowing function and/or weighting factors are applied to the difference between two terms in a least-squares curve-fitting function. However, each of these embodiments is exemplary only, and not limiting.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
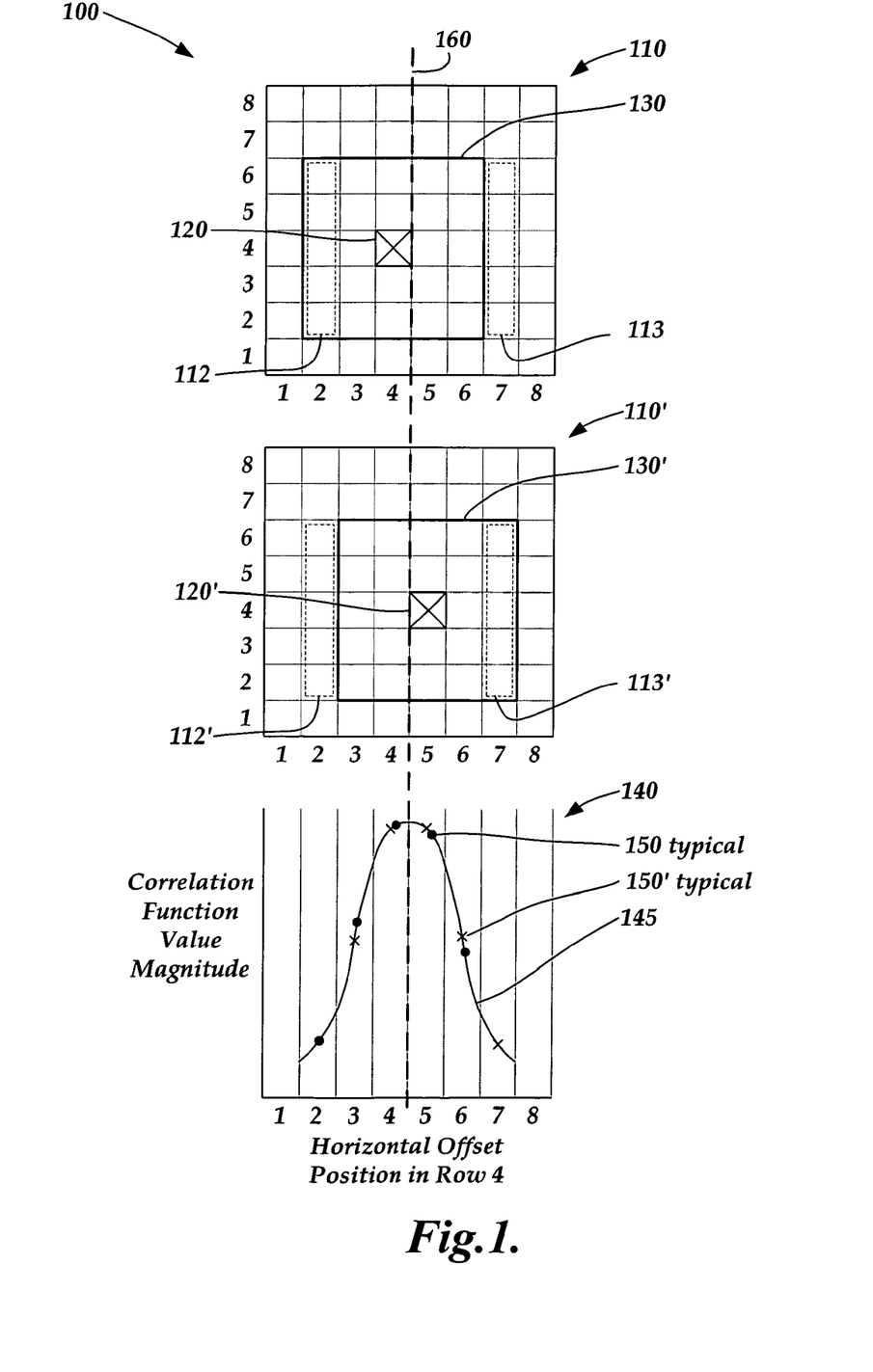
FIG. 1 is a diagram illustrating one example of how periodic sub-pixel errors may arise when determining displacements based on estimating correlation function peak locations using relatively few correlation function value points.

FIG. 1 shows a diagram 100 that illustrates one way of describing how periodic sub-pixel errors may arise when determining displacements by estimating correlation function peak locations using relatively few correlation function value points. The diagram 100 shows a first schematically illustrated 2D correlation function value point pseudo-image 110 corresponding to a first displacement between a reference image of an object and a first subsequent image of the object. Also shown is a second schematically illustrated 2D correlation function value point pseudo-image 110' corresponding to a second displacement between the same reference image of an object and a second subsequent image of the object. Also shown is 1D correlation function value magnitude plot 140. The pseudo-images 110 and 100', and the plot 140, are all aligned to a common reference frame along the horizontal direction in the FIG. 1, as described in greater detail below.

The schematic illustration of the pseudo-image 110 shows an 8×8 grid of pseudo-pixels. Each particular pseudo-pixel location corresponds to a particular (X,Y) or (row, column) pixel offset between the reference image and a first subsequent displaced image provided by a displacement sensor, when the correlation function value corresponding to that particular offset is determined. The value assigned to that pseudo-pixel is the corresponding correlation function value, rather than an image intensity value.

In FIG. 1, one pseudo-pixel corresponding to the peak correlation function value point 120 is filled with an "X". That pseudo-pixel corresponds to the most extreme-valued correlation function value within the pseudo-image 110 (i.e. the one that is closest to the correlation function peak). Various known image correlation processes begin by finding the peak correlation function value point 120. In various embodiments, the operations that determine the location of the peak correlation function value point 120 may comprise a fast- or coarse-search technique, such as one of the techniques outlined in the incorporated '291 or '254 patents.

It should be appreciated that in general purpose image correlation displacement sensing systems such as those under consideration here, the ability of the sensing system to track motion of an object at the highest practical speed is a desirable feature. This depends on the displacement sensing system's measurement cycle rate or sample rate, which in turn may depend on the speed with which image processing, correlation, and final sub-pixel correlation peak finding operations can be performed. Thus, in various embodiments, it may be important to reduce the number of correlation operations to a practical minimum, and find the final sub-pixel correlation peak location in a particularly efficiently manner. Accordingly, in various embodiments, first the peak correlation function value point 120 is determined, then a limited number of correlation function value points (CFVPs) in its vicinity are analyzed to determine the correlation peak location with sub-pixel resolution. In this example, for the pseudo-image 110, the limited number of CFVPs in the 5×5 analysis region 130 are analyzed. The analysis region 130 is selected such that it is centered about the peak correlation function value point 120.

Although the analysis region 130 includes enough data to locate the peak of the corresponding correlation function in two dimensions, for simplicity and clarity, in this discussion the peak location is only considered along one dimension. In particular, the 1D correlation function value magnitude plot 140 shows the CFVPs 150 (each of which is indicated by a "dot" symbol), corresponding to the values of the pseudo-pixels that are located in the same row of the analysis region 130 as the peak correlation function value point 120 (that is, row four). The correlation function value magnitude plot 140 also shows the underlying "true" correlation function 145, that would be determined if the reference and displaced images had "infinite" resolution and could be compared at a continuum of offset values. The true peak location 160 of the true correlation function 145 is indicated by a dashed line, and is a discussed further below. For purposes of explanation, the CFVPs 150 may be thought of as "sampling" the underlying true correlation function 145 at discrete points, in order to estimate the underlying curve and/or the true peak location 160.

The schematic illustration of the pseudo-image 110' is analogous to the pseudo-image 110, and all of its "primed" numbered elements may be understood based on the previous description of their unprimed counterparts in the pseudo-image 110. Corresponding to the pseudo-image 110', the 1D correlation function value magnitude plot 140 shows the CFVPs 150' (each of which is indicated by an "x" symbol), corresponding to the values of the pseudo-pixels that are located in the same row of the analysis region 130' as the peak correlation function value point 120' (that is, row four).

For purposes of this explanation, it is assumed that the second displaced image that is correlated to the reference image in order to determine the pseudo-image 110', is infinitesimally displaced relative to the first displaced image that is correlated to the reference image to determine the pseudo-image 110. Because the first and second displaced images vary only infinitesimally, the underlying true correlation function 145 shown in correlation function value magnitude plot 140 may correspond to the pseudo-image 110' as well as the pseudo-image 110. However, because the true peak location 160 falls approximately midway between the fourth and fifth horizontal offset positions that are used to determine the CFVPs, that infinitesimal difference is sufficient to causes the peak correlation function value point 120' to shift by one horizontal offset position relative to the peak correlation function value point 120. As a result, the analysis region 130' (which is centered relative to the peak correlation function value point 120' according to the same procedure used relative to the pseudo-image 110) also shifts by one horizontal offset position, excluding the set of pseudo-pixels 112 of the analysis region 130 and including a "new" set of pseudo-pixels 113. For all of these reasons, even though the difference between their underlying image displacements may be infinitesimal, the sampling of the underlying true correlation function 145 by the CFVPs 150' may be significantly different than that provided by the CFVPs 150. As a result, an estimate of the true peak location 160 based on the CFVPs 150' may differ from an estimate based on the CFVPs 150. The difference between the estimates may be small relative to the pixel spacing. However, it should be appreciated that even small improvements in the accuracy and/or robustness of such estimates of the true peak location 160 are important in numerous applications of image correlation displacement sensing systems.

In summary, the discrete sampling described above may introduce inaccuracies into the resulting estimated correlation function peak location, due to the limited resolution of the reference image and displaced correlation images, the limited resolution of the steps between the horizontal offset positions corresponding to the CFVPs, the discrete nature of the peak correlation value point (120, 120') selection, and the like. These inaccuracies may be exacerbated when relatively few CFVPs are used when estimating the correlation function peak location. In addition, these inaccuracies may be exacerbated whenever the true peak location 160 falls approximately midway between the horizontal offset positions that are used when determining the CFVPs. A periodic sub-pixel error may result, which will cause related errors in the displacement measurements provided by an image correlation displacement sensing system.

It should be appreciated that although FIG. 1 shows an example in the correlation function value magnitude plot 140 wherein the location corresponding to the best correlation between the reference and displaced images is adjacent to a maximum CFVP (which may correspond to the best correlation position for a multiplicative type correlation function for example), this invention is not so limited. In various embodiments, a "sum of the absolute differences" (SAD) type correlation function may be used to advantage. As known in the art, a SAD type correlation function produces a trough rather than a peak, and in such a case the location corresponding to the best correlation between the reference and displaced images is adjacent to a minimum CFVP. Therefore, it is to be understood in this disclosure that the location associated with the "best correlation" extremum of a true continuous correlation function may be called the correlation function peak location, regardless of whether the underlying correlation function actually produces a peak or a trough. Similarly, the most extreme CFVP may be called the peak CFVP, even in the case where it may be a minimum valued CFVP that is associated with a correlation trough, such as that produced by a SAD type correlation function.

The inventors have determined that for fitting a limited number of CFVPs, and particularly when fitting CFVPs that are based on a "sum of the absolute differences" (SAD) correlation method, a Gaussian curve fit may be advantageous for reducing errors in correlation function peak estimates. For example, for a limited number of points, under various conditions the Gaussian curve fit may produce somewhat lower errors than the methods taught in the '422 patent. However, fitting a Gaussian function to the CFVPs is not sufficient to eliminate the type of systematic periodic error outlined above with reference to FIG. 1.

One method for reducing the systematic error outlined above is to apply a windowing function to the CFVPs prior to, or as part of, the curve fitting operation. However, in contrast to the various studies and applications of windowing functions that may use a larger number of sampled points, or that may have better knowledge of the form of the "true" underlying curve, or the like, in practical correlation displacement sensing systems there may be a number of practical considerations and constraints such that a unique combination of operations may provide the most accurate method of estimating the "true" correlation function peak location with reduced errors, while also allowing relatively high displacement measurement rates. One exemplary combination of operations according to this invention that reduces the type of systematic periodic error outlined above, while also allowing the use of relatively few CFVPs and relatively high displacement measurement rates, is described with reference to the EQUATIONS 1-7, below. In particular, one exemplary embodiment for estimating the true 2D correlation function peak location for a two-dimensional set of CFVPs is outlined below. The various operations outlined below may be implemented in various circuits and/or routines included in a signal processing and control system associated with an image correlations displacement sensing system according to this invention. Various exemplary signal processing and control systems that are useable in conjunction with this invention are described in the incorporated references.

Figure 2:
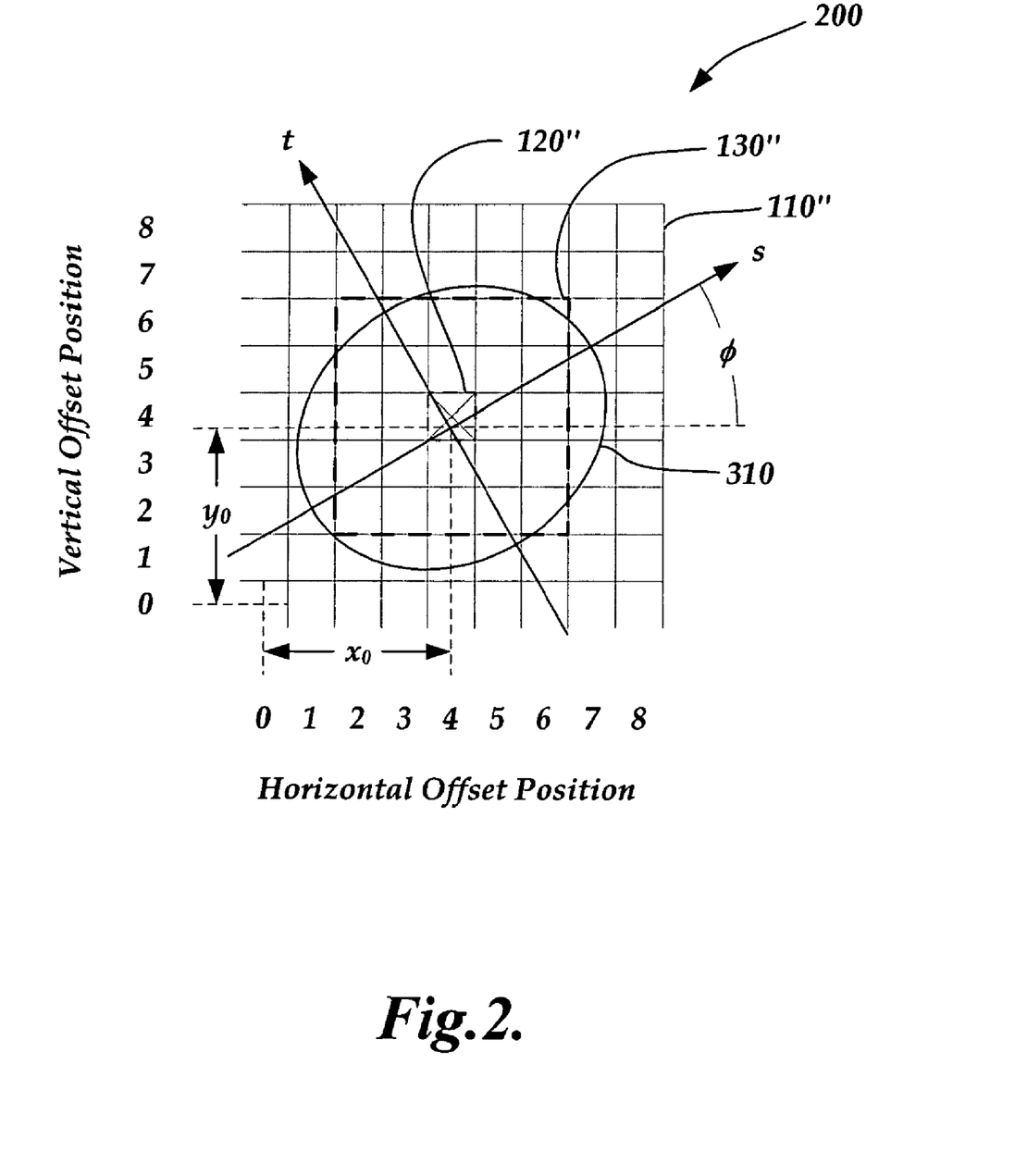
FIG. 2 is a graph illustrating a transformation of variables that is used in one embodiment of curve fitting operations that are usable in the routine of FIG. 3.

As previously indicated, for a limited number of CFVPs, it may be advantageous to perform a Gaussian curve fit. In one embodiment, the form of the Gaussian function GF that is used to approximate the underlying true correlation function may be expressed as:

$$GF = \sqrt{A - Be^{-\frac{s^2}{2\sigma_s^2}}e^{-\frac{t^2}{2\sigma_t^2}}} \quad \text{(Eq. 1)}$$

where $\sigma_s$ and $\sigma_t$ are the standard deviations of the Gaussian function GF, and s and t are transformed CFVP coordinates, as shown in FIG. 2 and described below.

FIG. 2 shows a diagram 200 that shows the transformed (s,t) CFVP coordinate system. FIG. 2 includes a schematic illustration of a pseudo-image 110" that is analogous to the pseudo-image 110 described above, and all of its "double-primed" numbered elements may be understood based on the previous description of their unprimed counterparts in the pseudo-image 110. For purposes of the explanation, an (x,y) coordinate system can be defined based on the horizontal and vertical offset positions of the CFVP pseudo-pixels, as shown. The ellipse 310 (which is shown with exaggerated elongation) schematically represents the base of a 2D Gaussian function GF that is positioned at the "best-fit" location relative to the CFVPs in the analysis region 130". The transformation equations between the CFVP (x,y) coordinate system and the transformed CFVP (s,t) coordinate system are:

$$s(x-x_0)\cos\phi + (y-y_0)\sin\phi$$

$$t = -(x-x_0)\sin\phi + (y-y_0)\cos\phi \quad \text{(Eq. 2,3)}$$

As shown in FIG. 2, the location $(x_0, y_0)$ corresponds to the geometric center of the ellipse 310 that is the base of the best-fit 2D Gaussian function GF, and the angle $\phi$ corresponds to the rotation of the major axis of the ellipse 310 relative to the x-axis. The location $(x_0, y_0)$, in general, will be located between the discrete offset positions with sub-pixel resolution and, ideally, coincides as closely as possible with the peak of the true 2D correlation function that is sampled by the CFVPs in the analysis region 130".

Signal processing in a practical image correlation displacement sensing systems may be performed in a faster and simpler manner by avoiding complications associated with the square root in EQUATION 1. Thus, in one embodiment, the square of the function GF may be fit to the squares of the CFVPs. The following function $GF^2$ may be fit to the squares of the CFVPs, referred to hereafter as $CVFP^2$s:

$$GF^2 = A - Be^{-\frac{s^2}{2\sigma_s^2}} e^{-\frac{t^2}{2\sigma_t^2}} \qquad \text{(Eq. 4)}$$

The function $GF^2$ has the same peak location as the function $GF$ when it is fit to the values of the $CVFP^2$s.

The analysis region 130" may generally be characterized as an M-by-N region, extending from pseudo-pixel $(x_{min}, y_{min})$ at the lower left to $(x_{min+M}, y_{min+N})$ at the upper right. In the foregoing descriptions of the analysis regions 130-130", M=N=5. The method of least squares may be used to find the best-fit parameters $x_0$ and $y_0$, and also the other best-fit parameters $A$, $B$, $\sigma_s$, $\sigma_t$, and $\phi$. In order to fit the function $GF^2$ to the $CFVP^2$s in the analysis region 130", without the application of a windowing function, the following least squares function F may be defined and minimized:

$$F(x_0, y_0, A, B, \sigma_s, \sigma_t, \phi) = \qquad \text{(Eq. 5)}$$
$$\sum_{x=xmin}^{xmin+m} \sum_{y=ymin}^{ymin+n} [GF^2(x,y) - CFVP^2(x,y)]^2$$

The foregoing function F may be modified to implement a windowing function that reduces the systematic sub-pixel errors, outlined above reference to FIG. 1, in the resulting estimate of the 2D correlation function peak. In one embodiment, the windowing function may be implemented by applying discrete weighting factors $W(x,y)$ in a function FW as follows:

$$FW(x_0, y_0, A, B, \sigma_s, \sigma_t, \phi) = \qquad \text{(Eq. 6)}$$
$$\sum_{x=xmin}^{xmin+m} \sum_{y=ymin}^{ymin+n} W(x,y) * [GF^2(x,y) - CFVP^2(x,y)]^2$$

The best-fit parameters $(x_0, y_0, A, B, \sigma_s, \sigma_t, \phi)$ that minimize the function FW may be determined according to known optimization techniques and/or optimization routines available in commercially available software libraries.

In various embodiments according to this invention, the weighting factors $W(x,y)$, corresponding to the analysis region 130", are determined with reference to the location of a preliminary estimate of the 2D correlation function peak location, wherein the preliminary estimate of the correlation function peak location is made with sub-pixel resolution. In various embodiments, the preliminary estimate of the correlation function peak location is made using relatively few CFVPs proximate to the peak correlation function value point 120", for example according to one of the methods for estimating a correlation function peak with sub-pixel resolution as described in the '422 patent. The importance of establishing the location of a windowing function and/or the associated weighting factors $W(x,y)$ on the basis of a preliminary sub-pixel resolution estimate of a correlation function peak location has not been previously recognized. We hereafter refer to the location of the preliminary sub-pixel resolution estimate of the correlation function peak as the location $(x_p, y_p)$.

It should be appreciated that, in various embodiments, the window function and/or weighting factors are chosen to significantly attenuate the influence of the pseudo-pixels near the periphery of the analysis region 130" on the curve-fitting operations. In various embodiments, the weighting factors $W(x,y)$ may correspond to a conical windowing function, a Gaussian windowing function, or a sigmoid function, or the like. Using a conical weighting function as an example, in one embodiment where the analysis region has a size M=N=5, the weighting factors may be determined based on a windowing function corresponding to a weighting value of 1.0 at the location $(x_p, y_p)$, and a weighting value of zero at a radius of 2.5 offset increments or more from the location $(x_p, y_p)$, for example:

$$W(x,y) = \frac{\sqrt{(x-x_p)^2 + (y-y_p)^2}}{(M/2)}, \qquad \text{(Eq. 7)}$$
$$\text{for } \sqrt{(x-x_p)^2 + (y-y_p)^2} \leq (M/2)$$
and
$$W(x,y) = 0, \text{ for } \sqrt{(x-x_p)^2 + (y-y_p)^2} > (M/2)$$

It will be appreciated that the particular weighting factors described above are exemplary only and not limiting. More generally, provided that the windowing function and/or weighting factors are chosen to significantly attenuate the influence of the pseudo-pixels adjacent to the periphery of the analysis region 130" on the curve-fitting operations, various types of windowing functions may be applied. In various embodiments, the attenuation of the curve-fitting terms corresponding to pseudo-pixels adjacent to the periphery need not approach zero as closely as in the example above. For example, in some embodiments, some of the terms corresponding to pseudo-pixels adjacent to the periphery may have weighting factors that are one the order of ½ the magnitude of the maximum possible weighting factor, or more, and advantageous results may still be obtained.

Furthermore, in the example shown in EQUATION 6 the weighting factors are applied to the differences in the least squares minimization function FW. However, it should be appreciated that although this approach has the advantage that it is straightforward to implement, it is exemplary only, and not limiting. For example, although it may be somewhat more complex to implement and/or produce somewhat less desirable results, in various embodiments a similar sub-pixel error reduction effect may be achieved by separately weighting the individual terms $GF^2(x,y)$ and $CFVP^2(x,y)$, or even the terms $GF(x,y)$ and $CFVP(x,y)$, with appropriate individual weighting factors. These and other mathematical alternatives that may provide a similar benefit in terms of systematic sub-pixel error reduction will be apparent to one skilled in the art. However, in each case, according to one principle of this invention the related windowing functions and/or weighting factors should be determined with reference to the location of a preliminary estimate of the 2D correlation function peak location, wherein the preliminary estimate of the correlation function peak location is made with sub-pixel resolution.

Figure 3:
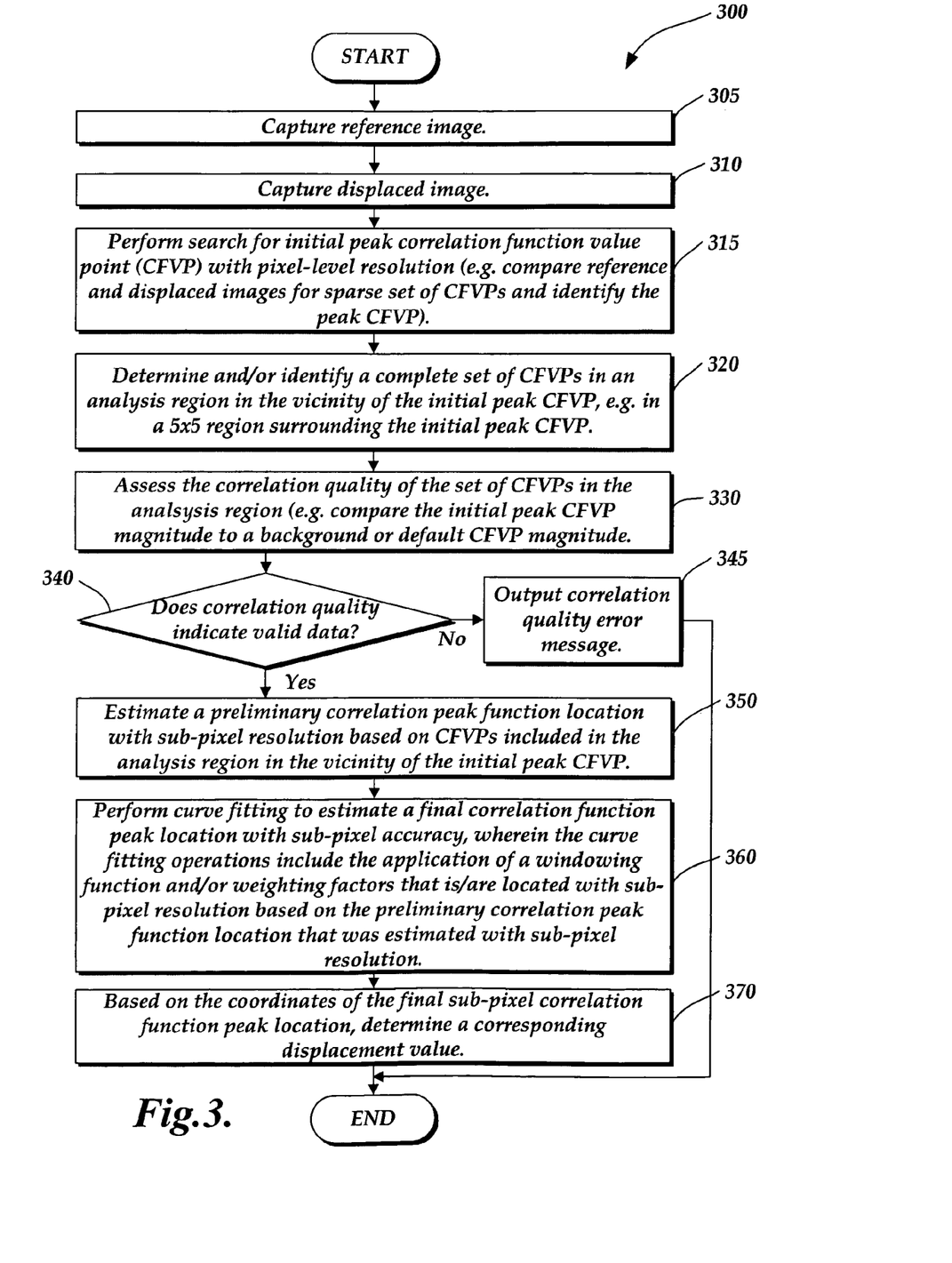
FIG. 3 illustrates one exemplary embodiment of a routine according to this invention, for estimating correlation function peak locations with reduced periodic sub-pixel errors using relatively few correlation function value points.

FIG. 3 illustrates one exemplary embodiment of a routine 300 according to this invention, for estimating a correlation function peak location in an image correlation displacement sensing system with reduced periodic sub-pixel errors, using relatively few correlation function value points. The routine 300 starts at a block 305, where a reference image is captured. The routine continues at a block 310, where a displaced image is captured.

Next, at a block 315, a search for an initial peak correlation function value point (CFVP) is performed with pixel-level resolution, based on comparing the reference and displaced images. In one embodiment, the reference and displaced images may be compared using a "sum of the absolute differences" (SAD) correlation technique (sometimes also known as an "absolute value of the differences", or "AVD" technique). Two-dimensional (2D) SAD CFVPs may be determined according to known techniques, for example, by analogy with the description of EQUATION 2 that is included in the U.S. Pat. No. 6,937,349. In various embodiments, the operations that determine the location of the initial peak correlation function value point with pixel-level resolution may comprise a fast-, coarse-, or sparse-search technique, such as one of the techniques outlined in the incorporated '291 or '254 patents, or the like.

Next, at a block 320, a complete set of CFVPs are determined or identified in an analysis region in the vicinity of the initial peak CFVP, e.g. in an analysis region centered around the initial peak CFVP. For example, in various embodiments the initial peak CFVP, identified by the operations of block 315, may correspond to the peak correlation function value point 120" discussed above with reference to FIG. 2. Then, in various embodiments, an analysis region corresponding to the analysis region 130" is selected such that it is centered about the initial peak CFVP. The analysis region may consist of a region of M×N pseudo-pixels, as previously outlined. In one embodiment M=N=5, and in another embodiment M=N=3, although it will be understood that these values for M and N are exemplary only, and not limiting. Regardless of the size of the analysis region, in various embodiments, the operations of block 320 determine a complete set CFVPs throughout the analysis region. It will be appreciated that in some embodiments, the operations of the search performed to find the initial peak CFVP at block 315 may include determining the CFVPs throughout a region that is searched to find the eventually-determined initial peak CFVP. In such a case, the operations of the block 320, may be limited to identifying an analysis region such that it is centered about the initial peak CFVP, and the included CFVPs will have been previously determined.

Next, at a block 330, the "correlation quality" of one of more CFVPs included in the analysis region is assessed. For example, in one embodiment, the ratio of the magnitude of the initial peak CFVP relative to the magnitude of a background or default CFVP is determined. The background or default CFVP magnitude corresponds to a "noise" value, that is, a value indicative of no significant correlation. Such a value may be known by design (a default value), or by determining a background CFVP (or an average of CFVPs) at a predetermined distance away from the initial peak CFVP, such that is certain to fall outside of the correlation peak.

Next, at a decision block 340, is determined whether the correlation quality is indicative of a valid correlation function peak. For example, if the previously described "correlation quality" ratio is 10, then the analysis region certainly includes a correlation function peak. Whereas, if the previously described ratio is near one, then the analysis region is unlikely to include a true correlation function peak. In practice, the correlation quality criteria applied at block 340 may be determined based on experience and/or analysis. If it is determined at the decision block 340 that the correlation quality does indicate a valid correlation function peak in the analysis region, then the routine continues to a block 350. Otherwise, if it is determined that the correlation quality does not indicate a valid correlation peak, then operation continues to a block 345, where a correlation quality error message is output, and the routine ends. It will be appreciated that the blocks 330, 340, and 345 may be optional or omitted in various embodiments of the routine 300. While the operations of the blocks 330, 340 and 345 provide features that tend to enhance the reliability and/or reduce a risk of error that may be associated with an image correlation displacement sensing system according to this invention, they have no effect on the ultimate resolution or accuracy of a correlation function peak location that is estimated based on CFVPs associated with a true correlation function peak.

At the block 350, a preliminary correlation function peak location is estimated with sub-pixel resolution, based on the CFVPs included in the analysis region in the vicinity of the initial peak CFVP. In various embodiments, the preliminary correlation function peak location is estimated with sub-pixel resolution using relatively few CFVPs proximate to the initial peak CFVP (e.g. the peak CFVP 120"), for example according to one of the methods described in the '422 patent. However, in various other embodiments, any other now known or later-developed method that can estimate a preliminary correlation function peak location with sub-pixel resolution, based on the CFVPs included in the analysis region, may be used.

Next, at a block 360, curve-fitting to estimate a final correlation function peak location with sub-pixel accuracy is performed, wherein the curve-fitting operations include the application of a windowing function and/or weighting factors that is/are located with sub-pixel resolution based on the preliminary sub-pixel correlation function peak location determined by the operations of block 350. For example, in various embodiments, the operations of the block 360 may implement a method according to the teachings outlined above with reference to EQUATIONS 1-7. Then, at a block 370, based on the coordinates of the final estimated sub-pixel correlation function peak location, a corresponding displacement value is determined, and the routine ends.

Although the foregoing embodiments according to this invention have generally been described as determining the peak of a correlation function in order to estimate the best correlation location for a reference in displaced image, it should be appreciated that it is also known to estimate the best correlation location based on estimating the centroid of a correlation function. When such methods are applied, systematic sub-pixel errors similar to those described herein with reference to FIG. 1 may arise, for similar reasons. In a manner analogous to that outlined above may, a windowing function and/or a set of weighting factors may be applied to the CFVPs used for estimating the centroid in order to reduce such systematic sub-pixel errors. Thus, although there may be disadvantages to the centroid estimating method when using relatively few CFVPs, it may nevertheless be used in conjunction with various other aspects of this invention in various embodiments, and satisfactory results may still be obtained. In particular, the estimation of a best correlation location with sub-pixel accuracy based on centroid estimation may include the application of a windowing function and/or a set of weighting factors (e.g. for weighting a set of CFVPs) that is/are located with sub-pixel resolution based on a preliminary sub-pixel correlation function peak location.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

Figure 4:
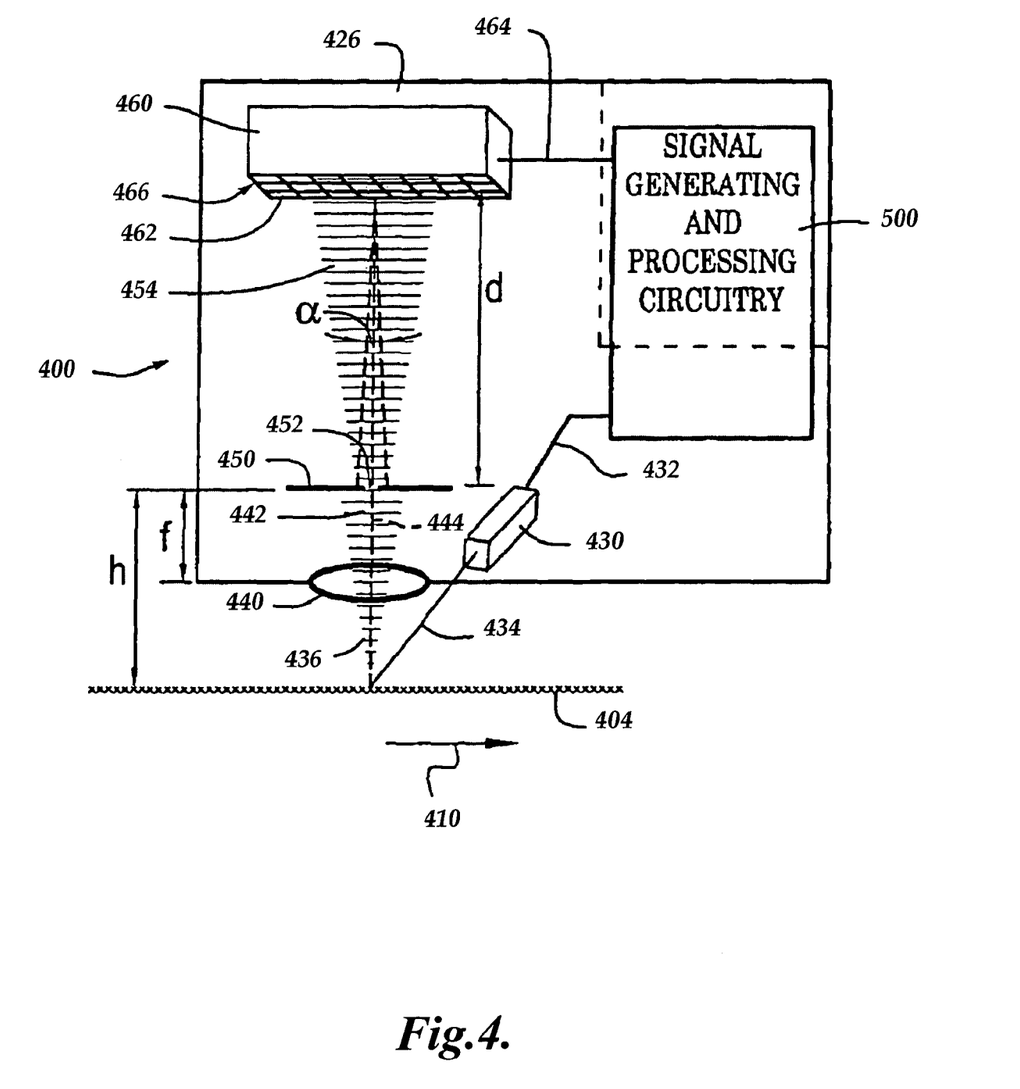
FIG. 4 is a block diagram illustrating one exemplary embodiment of one type of image correlation displacement sensing system in which the correlation function peak finding method of the present invention may be used.

FIG. 4 is a block diagram illustrating one exemplary embodiment of one type of image correlation displacement sensing system in which the correlation function peak finding method of the present invention may be used. As shown in FIG. 4, the image correlation displacement system comprises a correlation-image-based optical position transducer 400 which includes a readhead 426, signal generating and processing circuitry 500 and an optically rough surface 404. In FIG. 4, the components of the readhead 426, and their relation to the optically rough surface 404, are shown schematically in a layout that generally corresponds to an exemplary physical configuration, as further described below. The correlation-image-based optical position transducer 400 that uses speckle images, as well as various suitable mechanical and optical configurations, image correlation methods, and associated signal processing circuitry, are described in greater detail in the incorporated '254 patent.

In particular, the optically diffusing, or optically rough, surface 404 is positioned adjacent to an illuminating and receiving end of the readhead 426, such that when optically rough surface 404 is illuminated by light emitted from that end of the readhead 426 by a light source 430, the emitted light is scattered back from the optically rough surface 404 towards the image receiving optical elements positioned at that end of the readhead 426. The optically rough surface 404 may be part of a specially-provided element, or it may be provided as an integral surface of a separately-existing mechanism.

In either case, the optically rough surface 404 is positioned at a generally stable distance from the light source and an optical system housed in the readhead 426, and moves relative to readhead 426 along one or two axes of relative motion, such as the measuring axes 410 and 412 in FIG. 4. When motion in two dimensions is allowed, there are usually no constraints on the permitted motion within the lateral bounds of the two-dimensional area of the optically rough surface 404. When only a single dimension of relative motion is permitted, the relative motion is generally constrained along one of the measuring axes 410 or 412 by conventional guideways or bearings (not shown) mounted to a frame that maintains the proper relative position between the readhead 426 and the optically rough surface 404. The readhead 426 may include an alignment feature (not shown) which aids in mounting the readhead 426, and aligns the internal components of the readhead 426 relative to the mounting frame and/or the expected axis or axes of relative motion of the optically rough surface 404.

As shown in FIG. 4, the image receiving optical elements of the readhead 426 include a lens 440 positioned at the illuminating and receiving end of the readhead assembly 406 such that the optical axis of the lens 440 is generally aligned with the illuminated spot on the optically rough surface 404. The readhead 426 further includes a pinhole aperture plate 450, spaced apart from the lens 440 along an optical axis, and a light detector 460 spaced apart from the aperture plate 450 along the optical axis, as shown in FIG. 4. The light detector 460 can be any known or later-developed type of light sensitive material or device that can be organized into an array of independent and individual light sensing elements, such as a camera, an electronic or digital camera, a CCD array, an array of CMOS light sensitive elements, or the like.

An exemplary spacing and positioning of the optically rough surface 404 and the readhead 426, including the lens 440, the aperture plate 450, and the light detector 460, is further described below. The mounting of the light source 430, the lens 440, the aperture plate 450, and the light detector 460 in the housing of the readhead 426 may be done according to conventional methods of miniature optical system construction and/or industrial camera construction, so long as the components are mounted in a precise and stable manner.

When the readhead 426 is suitably positioned adjacent to the optically rough surface 404, each image captured by the light detector 460 will contain a random pattern of relatively bright spots, or speckles, where the diffracted light waves from the optically rough surface 404 combine positively to form a peak, and relatively dark spots where the diffracted light waves from the optically rough surface 404 combine negatively to cancel out. The random pattern corresponding to any illuminated portion of the optically diffusing, or optically rough, surface 404 is unique. The optically rough surface 404 can therefore act as a displacement reference without the need for any special marks.

The light detector 460 has an array 466 of image elements 462 spaced apart along at least one axis at a known spacing. The known spacing provides the basis for measuring the displacement or offset between two images projected onto the light detector 460, and thus also provides the basis for measuring the displacement of the surface that determines the images, i.e., the optically rough surface 404.

In general, however, the array 466 will extend in two dimensions along two orthogonal axes at a known spacing along each axis. This known spacing need not be the same for both axes. For systems that permit movement along only a single axes, the array 466 will often have an extent along that dimension that is much greater than the extent of the array 466 across that dimension. For systems that permit two-dimensional movements, the extent of the array 466 along each of the two orthogonal will be roughly on the same order of magnitude, but need not be exactly the same.

In addition, the readhead 426 includes at least a portion of the signal generating and processing circuitry 500. As shown in FIG. 4, a signal line 432 from the signal generating and processing circuitry 500 is connected to the light source 430, to control and/or drive the light source 430. A signal line 464 connects the light detector 460 and the signal generating and processing circuitry 500. In particular, each of the image elements 462 of the array 466 can be individually addressed to output a value representing the light intensity on that image element 462 over the signal line 464 to the signal generating and processing circuitry 500. Additional portions of the signal generating and processing circuitry 500 may be placed remotely from the readhead 426, and the functions of the readhead 426 can be operated and displayed remotely.

As shown in FIG. 4, a light beam 434 is emitted by the light source 430 and is directed onto the optically diffusing, or optically rough, surface 404 to illuminate a portion of the optically diffusing, or optically rough, surface 404. As a result, the illuminated portion of the optically diffusing, or optically rough, surface 404 both scatters and diffracts light about the optical axis 444.

When the light source 430 is a white-light source, the light will generate an image of the illuminated portion, which can be projected onto the array 466 of the image elements 462. However, while this image can be correlated in the same way that a speckle image can be correlated, this image will not include speckles formed by scattering from the optically diffusing, or optically rough, surface 404.

When the light source 430 is coherent and is driven by the drive signal on the signal line 432 and outputs the light beam 434 as a coherent light beam, the coherent light beam 434 illuminates a portion of the optically diffusing, or optically rough, surface 404. The illuminated portion lies along the optical axis 444 of the optical system of the readhead 426. In particular, the light 436 scattered from the illuminated portion of the optically diffusing, or optically rough, surface 404 is gathered by the lens 440.

The lens 440 then projects the collected light 442 from the illuminated portion of the optically diffusing, or optically rough, surface 404 onto the pinhole aperture plate 450 having the pinhole aperture 452. The lens 440 is spaced from the plate 450 by a distance f, which is equal to the focal length of the lens 440. The pinhole aperture plate 450 is spaced from the illuminated portion of the optically diffusing, or optically rough, surface 404 by a distance h.

By locating the plate 450 at the focal distance f of the lens 440, the optical system of the speckle-image-based optical position transducer becomes telecentric. Moreover, by using the pinhole 452 in the pinhole plate 450, the speckle size and the dilation of the speckle pattern depends solely on the dimensions of the pinhole 452 and, more particularly, becomes independent of any lens parameters of the lens 440.

The collected light 442 from the lens 440 passes through the pinhole 452. In particular, the light 454 passed by the pinhole 452 is projected along the optical axis 444 and onto the array 466 of the image elements 462 of the light detector 460. The surface of the array 466 of the light sensitive elements 462 is separated from the plate 450 by a distance d. The speckle size depends only on the angle a subtended by the dimensions of the pinhole 452 and the distance d between the pinhole plate 450 and the surface formed by the array 466 of image elements 462 of the light detector 460.

The approximate size D of the speckles within the detected portion of the light received from the illuminated portion of the optically diffusing, or optically rough, surface 404 onto the array 466 of the image elements 462 is:

$$D \approx \lambda/\tan(\alpha) = (\lambda * d)/w \qquad \text{(Eq. 8)}$$

where:

$\lambda$ is the wavelength of the light beam 434;

d is the distance between the pinhole plate 450 and the surface of the array 466;

w is the diameter of a round pinhole 452; and $\alpha$ is the angle subtended by the dimension w at a radius equal to distance d.

In various exemplary embodiments, typical values for these parameters of the optical position transducer 400 include: $\lambda$=0.6 μm, d=10 cm ($10^5$ μm), and w=1 mm ($10^3$ μm). As a result, the approximate speckle size D is 60 μm.

To achieve high resolution, the average speckle size is most usefully approximately equal to, or slightly larger than, the pixel size of the image elements 462 of the light detector 460. Moreover, in various embodiments of the readhead 426, the average speckle size is approximately two times to ten times the pixel spacing of the image elements 462.

To acquire an image, the signal generating and processing circuitry 500 outputs a drive signal on the signal line 432 to drive the coherent light source 430 to emit the coherent light beam 434. The light beam 434 illuminates a portion of the optically rough surface 404, which is imaged onto the array 466 of the image elements 462 of the light detector 460. The signal generating and processing circuitry 500 then inputs a plurality of signal portions over the signal line 464, where each signal portion corresponds to the image value detected by one or more of the individual image elements 462.

To determine a displacement of the optically rough surface 404 between any two images, the signal portions for a first image received from the light detector 460 by the signal generating and processing circuitry 500 are stored in memory. A short time later, the signal generating and processing circuitry 500 again drives the coherent light source 430 and inputs a second image signal from the light detector 460 over the signal line 464. Generally, the second image must be generated and acquired within a short time period after the first image is acquired, depending on the displacement speed of the optically rough surface 404 relative to the light detector 460. The time period must be short enough to insure that the first and second images "overlap" sufficiently. That is, the time period must be short enough to insure that a pattern of image values present in the first image is also present in the second image, so that a significant correlation between the two images can be determined.

The first image and the second, or displaced, image are processed to generate a correlation function. In practice, the second image is shifted digitally relative to the first image over a range of offsets, or spatial translation positions, that includes an offset that causes the pattern of the two images to substantially align. The correlation function indicates the degree of pattern alignment, and thus indicates the amount of offset required to get the two images to align as the images are digitally shifted.

The invention claimed is:

1. A correlation function peak finding method for use in an image correlation displacement sensing system for determining object displacements, the method comprising:

capturing a reference image;

capturing a displaced image;

searching for and identifying an initial peak correlation function value point (CFVP) with pixel-level resolution, based on determining a plurality of respective CFVPs that are determined based on at least a portion of the reference image and the displaced image, at a plurality of respective offset positions and identifying the peak CFVP in that plurality of respective CFVPs;

determining a complete set of CFVPs, the complete set of CFVPs including CFVPs that are determined at each of M×N offset positions included in an analysis region in the vicinity of the initial peak CFVP, where M and N are integers;

estimating a preliminary correlation function peak location with sub-pixel resolution ($x_p, y_p$), based on CFVPs included in the analysis region in the vicinity of the initial peak CFVP; and performing curve-fitting operations to estimate a final correlation function peak location with sub-pixel accuracy, wherein the curve-fitting operations include the application of at least one of a windowing function and a set of weighting factors (W(x,y)) that is/are determined with reference to the preliminary sub-pixel correlation function peak location that is estimated with sub-pixel resolution.

2. The correlation function peak finding method according to claim 1, further comprising applying a windowing function and/or weighting factors prior to, or as part of, fitting a correlation function curve (GF, $GF^2$) to a number of CFVPs.

3. The correlation function peak finding method according to claim 2, wherein the windowing function and/or the weighting factors are determined with reference to the location of a preliminary estimate of the correlation function peak location, wherein the preliminary estimate of the correlation function peak location is made with sub-pixel resolution.

4. The correlation function peak finding method according to claim 1, wherein the preliminary estimate of the correlation function peak location that is made with sub-pixel resolution is based on four CFVPs.

5. The correlation function peak finding method according to claim 1, wherein the windowing function and/or weighting factors are chosen to significantly attenuate the influence on the curve-fitting operations of the CFVPs near the periphery of an analysis region that is generally used for the curve-fitting operations associated with each of a number of displacement measurements.

6. The correlation function peak finding method according to claim 1, wherein the weighting factors may correspond to a conical windowing function, a Gaussian windowing function, or a sigmoid windowing function.

7. The correlation function peak finding method according to claim 1, wherein the correlation function curve is fit to 25 or less CFVPs for a two-dimension correlation function curve.

8. The correlation function peak finding method according to claim 1, wherein the correlation function curve is fit to 9 or less CFVPs for a two-dimension correlation function curve.

9. The correlation function peak finding method according to claim 1, wherein the weighting factors are determined based on a conical windowing function corresponding to a weighting value of 1.0 at a location $(x_p, y_p)$ that corresponds to the location of the preliminary estimate of the correlation function peak location that is made with sub-pixel resolution, and a weighting value of zero at a radius of M/2 offset increments, or more, from the location $(x_p, y_p)$.

10. The correlation function peak finding method according to claim 1, wherein M=N and N is at least 3 and at most 5.

11. The correlation function peak finding method according to claim 1, wherein the windowing function and/or weighting factors are applied to the difference between two terms in a least-squares curve-fitting function.

* * * * *